United States Patent [19]

McIntyre et al.

[11] Patent Number: 5,638,769

[45] Date of Patent: Jun. 17, 1997

[54] TEAT

[75] Inventors: Robert Dymock McIntyre, McIntyre's Lane, R D 5, Hunterville; Mark Alexander Jenkins, Feilding, both of New Zealand

[73] Assignee: Robert Dymock McIntyre, Hunterville, New Zealand

[21] Appl. No.: 418,470

[22] Filed: Apr. 7, 1995

[51] Int. Cl.⁶ .................................................. A01K 9/00
[52] U.S. Cl. ............................ 119/71; 606/236; 215/11.1
[58] Field of Search ........................... 119/71; 215/11.1, 215/11.4; 606/236; 222/490

[56] References Cited

U.S. PATENT DOCUMENTS

| | | | |
|---|---|---|---|
| 1,270,693 | 6/1918 | Caldwell | 215/11.1 |
| 2,223,179 | 11/1940 | Lougheed | 215/11.1 |
| 2,350,215 | 5/1944 | Christensen | 119/71 |
| 2,628,591 | 2/1953 | Coyner | 119/71 |
| 2,688,326 | 9/1954 | Lerman | 215/11.1 |
| 2,708,421 | 5/1955 | Jauch | 119/71 |
| 2,831,484 | 4/1958 | Garner | 215/11.1 |
| 4,915,242 | 4/1990 | Marte | 215/11.1 |

FOREIGN PATENT DOCUMENTS

| | | | |
|---|---|---|---|
| 140996 | 4/1950 | Australia. | |
| 54485/80 | 7/1983 | Australia. | |
| 741871 | 11/1943 | Germany | 119/71 |
| 1351549 | 11/1987 | U.S.S.R. | 119/71 |

*Primary Examiner*—Todd E. Manahan
*Attorney, Agent, or Firm*—Young & Thompson

[57] ABSTRACT

A teat includes a hollow body made of a resilient material. The body has an inlet end and an outlet end. The outlet end includes at least one slit through the wall of the body. The slit(s) do not extend into that area of the wall of the body which forms the extremity of the outlet end. Engaged with the inlet end is a valve when, in use of the teat, the teat is full of liquid the valve prevents liquid from flowing back through the inlet end upon a squeezing action being applied to the teat.

16 Claims, 4 Drawing Sheets

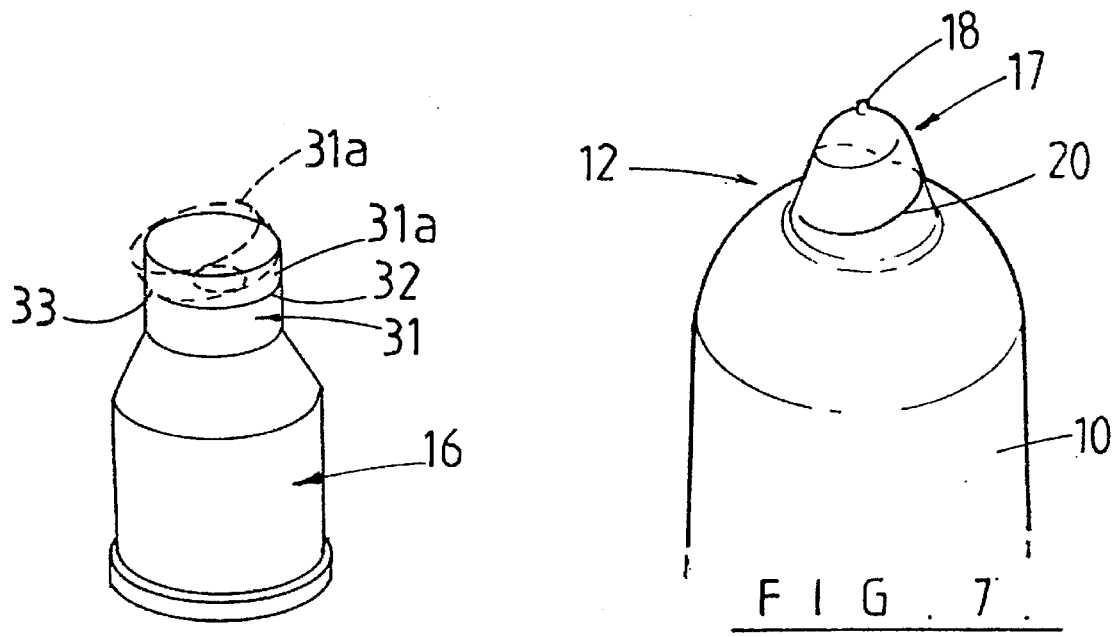
FIG. 8.
FIG. 7.
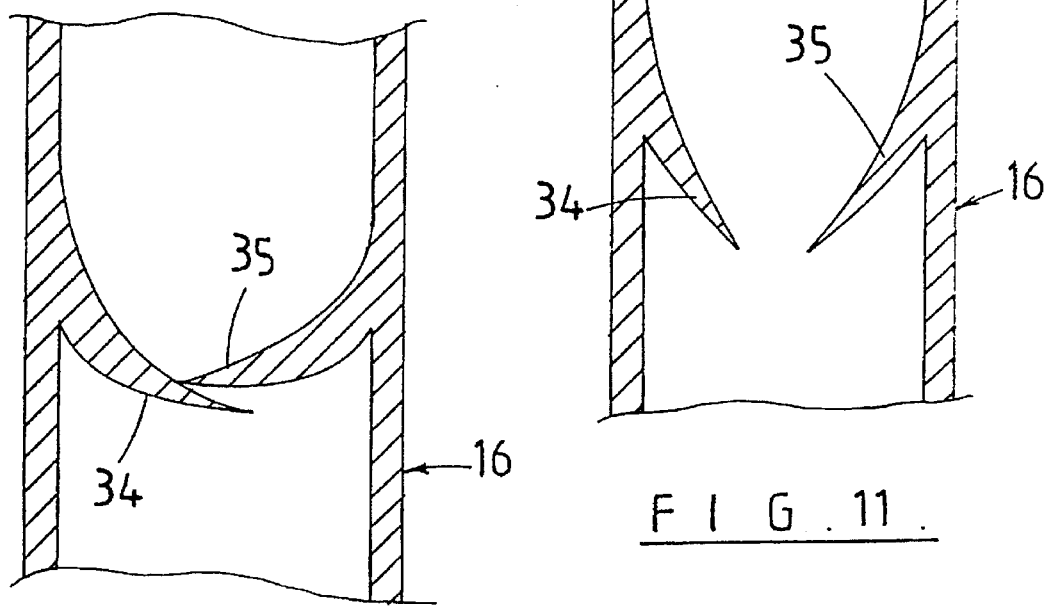
FIG. 10.
FIG. 11.

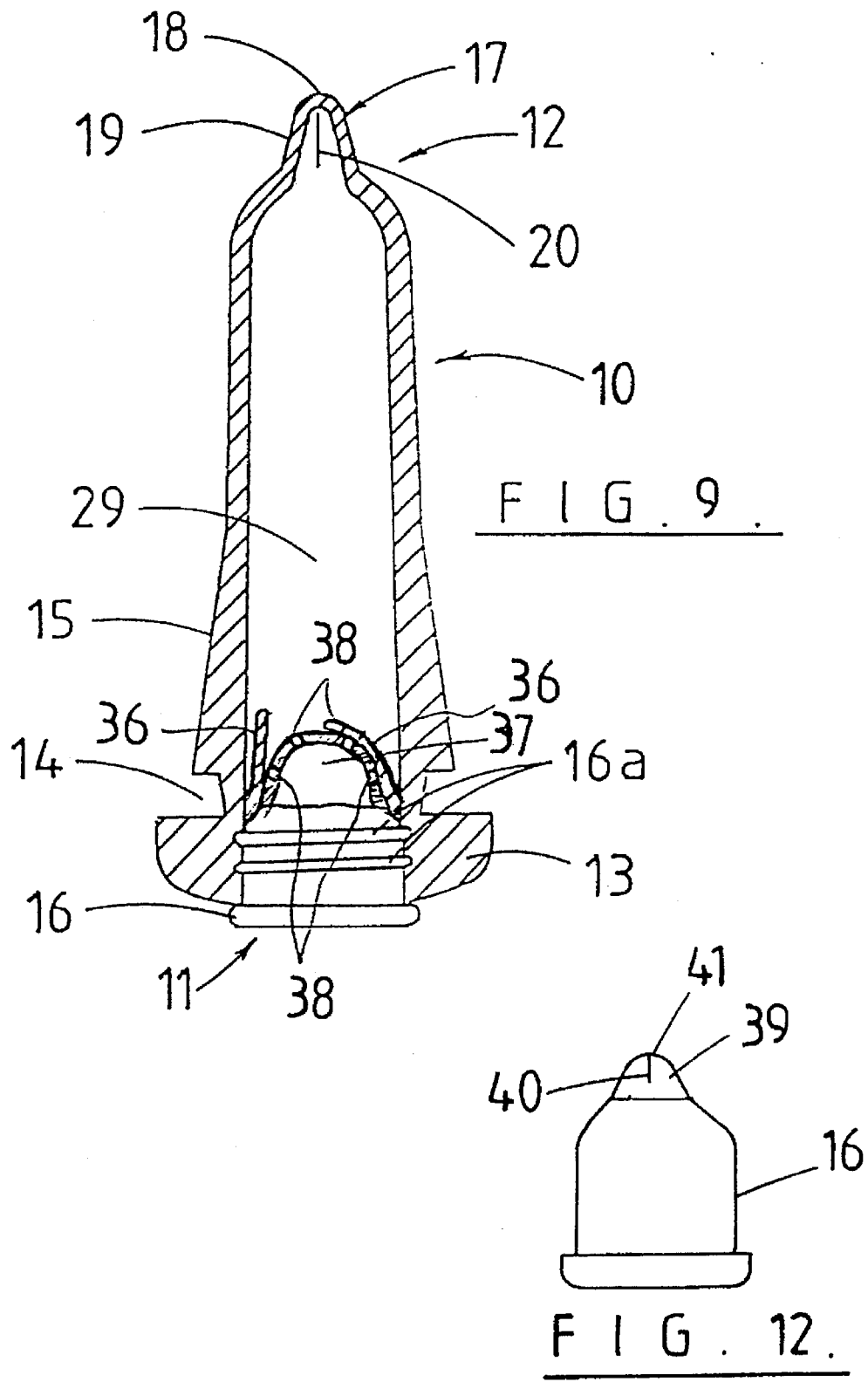

TEAT

BACKGROUND OF THE INVENTION

Discussion of the Background

This invention relates to a teat.

Teats for use in the feeding of animals, particularly rearing of young animals, are widely used. They generally consist of a shaped hollow elongate rubber body having an inlet end which is designed to be attached to a container or supply tube. The other or outlet end of the body incorporates in the extremity thereof apertures extending through the wall of the body such apertures usually being in the form of one or more slits.

The dilemma facing the manufacturer and end user of such teats is to realise a construction which enables an animal to obtain maximum flow of feed through the teat when suckling but which sealingly shuts off flow when the teat is not being suckled by the animal. Efforts to provide a good seal often results in a restriction to the flow of feed when the teat is being suckled.

SUMMARY OF THE INVENTION

The main object of the present invention is to provide a teat having such a construction that it provides both good flow and sealing characteristics.

Broadly the invention consists of a teat comprising a hollow body made of a resilient material said body having an inlet end and an outlet end said outlet end including one or more slits through the wall of the body, characterised in that said at least one slit does not extend into that area of the wall of the body which forms the extremity of the outlet end.

In the preferred form of the invention the outlet end includes a protuberance (eg. simulating a nipple) which defines an end wall portion merging into a side wall portion which in turn merges into that part of the body forming the outlet end. The said slit or slits extend along said side wall portion from where it merges into said part of the body forming the outlet end.

Preferably there are a plurality of slits which extend substantially axially relative to the longitudinal axis of symmetry of the body.

According to a preferred form of the invention the teat includes an outwardly flared external surface adjacent the inlet end of the body.

In a preferred embodiment the inlet end of the body is adapted to receive a separate element in the form of a valve or a bung.

The body is preferably formed from a thermoplastic rubber material.

BRIEF DESCRIPTION OF THE DRAWINGS

FIG. 7 is a perspective view of the outlet end of a second embodiment of the teat according to the invention, FIG. 8 is a perspective view of a valve insertable into the inlet end of the teat, FIG. 9 is a cross-sectional view of a valving arrangement forming part of a bung inserted into the inlet and of the teat, FIG. 10 is a cross-sectional illustration of a further valve arrangement for incorporation as an integral part of the bung, the valve being shown in the closed position, FIG. 11 is a view similar to FIG. 10 but showing the valve in an opened position, and FIG. 12 is an elevation view of yet a further form of valved bung for insertion into the inlet end of the teat.

DESCRIPTION OF THE PREFERRED EMBODIMENTS

Figure 1:
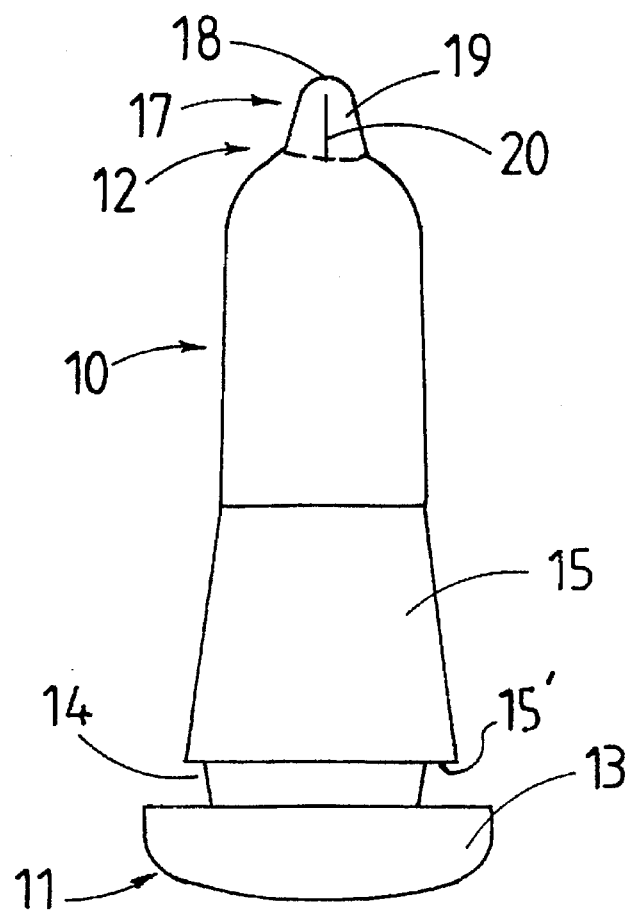
FIG. 1 is an elevation view of a teat according to a preferred form of the invention.
Figure 2:
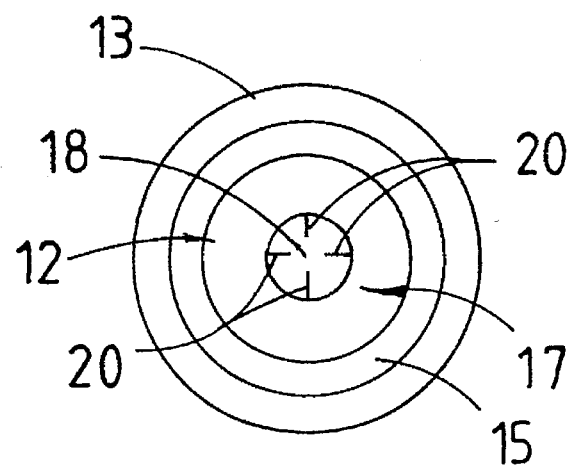
FIG. 2 is an end view of the teat of FIG. 1.

The teat 10 as shown in the drawings is moulded in one piece and according to the preferred form of the invention a natural rubber or a thermoplastic rubber material is used. A suitable thermoplastics rubber material is that sold under the trade name KRATON and manufactured by Shell Chemicals. In the preferred form of the invention a thermoplastic rubber material is preferred to a natural rubber material (which is presently used for teats of this type) as it provides superior memory characteristics. Also it can lead to reduction in production costs, more particularly costs arising from production time.

Figure 3:
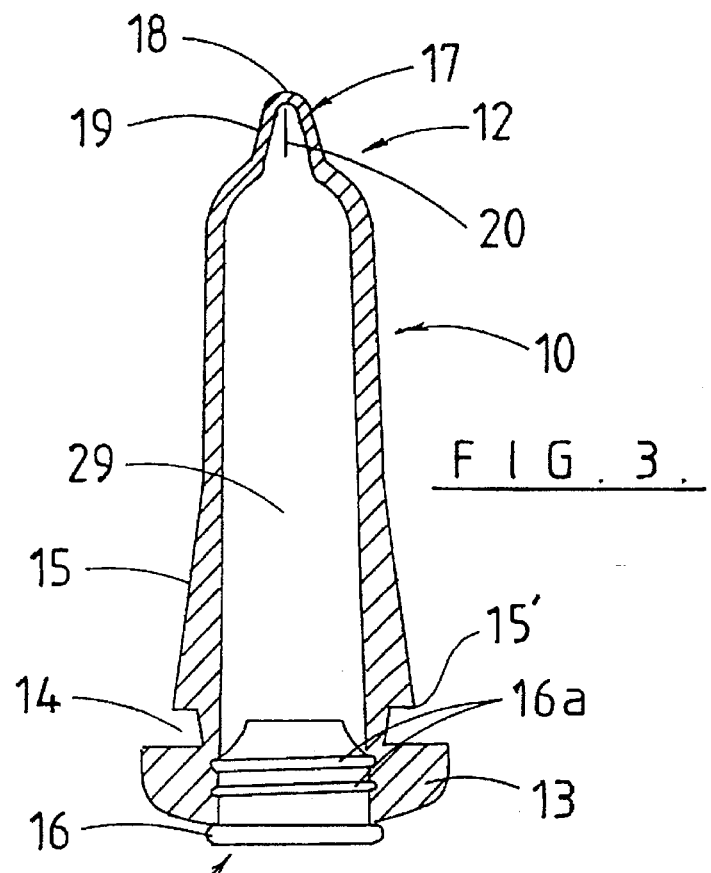
FIG. 3 is a sectioned elevation view of the teat shown in FIGS. 1 and 2.

Body 10 is of hollow construction having an inlet end 11 and outlet end 12. The inlet end 11 is provided with radially disposed flange 13 adjacent which is a groove 14. This groove 14 is defined by flange 13 and an end wall or shoulder surface 15' of an outwardly flared body portion 15 conveniently formed by an increased wall thickness of the body (see FIG. 3).

The teat can thus be fitted into an opening in the wall of a container in a conventional manner by the area of the wall of the container defining the opening being engaged in groove 14. Such container normally has a plurality of teats mounted about its periphery with the teats either being located, in a flood feed situation, at a lower end of the container or, as has hitherto been more conventional, toward an upper end of the container with a tube extending from the inlet end of the teat into the container.

When the teat according to the present invention is used with a tube extending from the inlet end thereof an end of the tube is engaged within an axial bore (not shown) in bung 16. As illustrated bung 16 has a plurality of annular ribs 16a which engage in correspondingly spaced and shaped grooves in flange 13. Thereby bung 16 can be readily removed and/or inserted.

Alternatively bung 16 can be held in place by a suitable adhesive or a bonding method suited to the plastic material used for the bung and teat.

The outlet end 12 is formed with a protuberance 17 which essentially simulates a nipple. This nipple 17 has a forwardly facing extremity in the form of curved end wall portion 18. A side wall portion 19 of nipple 17 merges into the curved wall portion defining the outlet end 12. One but preferably a plurality of slits 20 are provided for the outflow of feed from the outlet end. The slit or slits extend along said side wall 19 from generally the point where it merges into the curved end wall portion of outlet end 11.

Preferably there are no more than four slits and the slits are axially orientated relative to a longitudinal axis of body 10. More preferably there are only two slits which are diametrically opposed relative to the longitudinal axis of symmetry of body 10. The slits do not extend across end wall 18 and preferably terminate at or just into the area of wall 18 where it merges into side wall 19. The slits or any two slits do not intersect.

According to a further form of the invention a single spiral slit 20 can be provided as shown in FIG. 7.

Figure 4:
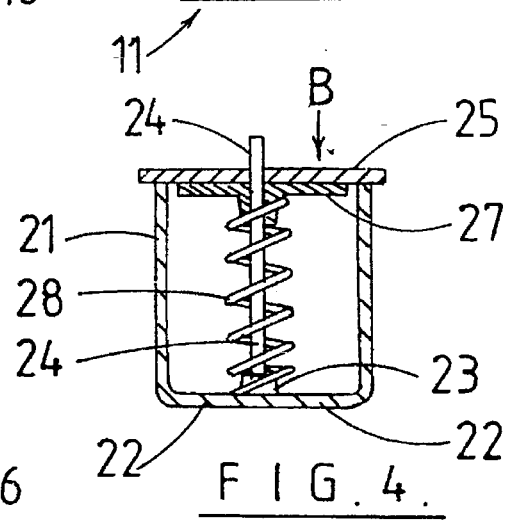
FIG. 4 is a sectioned view of a valve element designed to fit in the inlet end of the teat.
Figure 6:
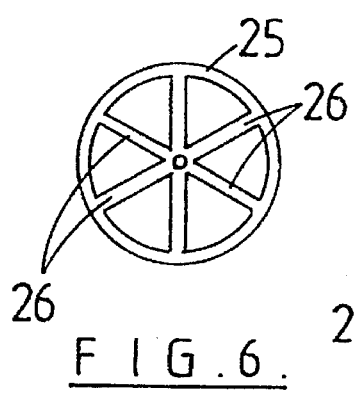
FIG. 6 is an end view of the valve taken in the direction of arrow B.
Figure 5:
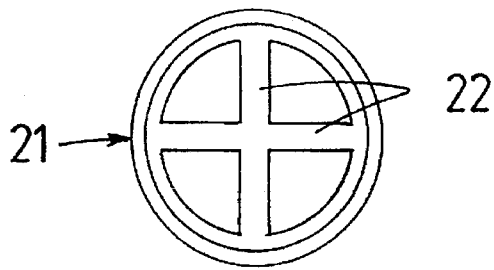
FIG. 5 is an end view in the direction of arrow A of the valve shown in FIG. 4.

In FIGS. 4-6 there is illustrated a valve which comprises a body 21 having peripheral ribs which are engageable in the peripheral grooves formed in inside wall of the inlet end 11. Valve body 21 is open at both ends save at one end there are radially disposed spokes 22 which intersect and provide a mounting 23 for a valve shaft 24. The other end of valve body 21 is engaged with an annular ring 25 having spokes 26 which form at their intersection an opening through which valve shaft 24 can project. A valve element 27 in the form of a disc is slidingly engaged on valve shaft 24 and is biased by a spring 28 which results in the disc valve element 27 covering the openings formed between spokes 26.

This valve is generally inserted into inlet end 11 when the teat is used in a flood feed system. Accordingly as an animal suckles the teat the pressure differential which is set up results in valve element 27 moving against the spring bias allowing feed to flow from the container into the internal cavity 29 of the teat. As suction is removed the valve element 27 moves back to its closed position to thereby close cavity 29 from the interior of the container.

In the form of the bung 16 illustrated in FIG. 8 the bung is moulded from a suitable plastics material and the end 31 thereof which is innermost when bung 16 is inserted into the teat 10 is moulded closed. In a post-moulding operation, however, a peripheral cut 32 is formed in end 31 but does not extend completely about the end thus leaving an area of connecting material 33 which forms a hinge.

With the teat 10 full of feed (milk) an animal applies a squeezing action to the teat which not only causes milk to flow out through the slit(s) 20 but also to normally force back through the bung 16. Consequently the full charge of milk within the cavity 29 of teat 10 is not received by the animal.

However, with a valve in the inlet end of the teat the squeezing action of the animal causes the milk to apply a back pressure which ensures that flap 31a remains seated on the end 31 of the bung 16 thereby preventing back flow of milk through the bung 16. When the animal releases the teat 10 the pressure differential between the chamber 29 of the teat and the milk supply to the teat (via bung 16) causes milk to flow through the bung 16 thereby lifting flap 31a to an open position (as shown in dotted detail in FIG. 8). This ensures that a full charge of milk is received in chamber 29 via bung 16 prior to the animal next applying a squeezing action to the teat.

Other means of forming the valve integrally with the bung 16 can be provided. For example, in FIGS. 10 and 11 there is shown a valve arrangement which can be moulded within the bung 16 and is comprised of a pair of overlapping flaps 34 and 35, these flaps taking up the overlapping position and thereby closing the valve when there is a back flow (ie the animal squeezes on the teat) and move apart to open the valve when the animal has ceased squeezing and milk flows from the milk supply into the chamber 29 of the teat 10.

In the arrangement shown in FIG. 9 there is shown a further arrangement where flaps 36 are moulded integrally with the body of the teat 10 and cover a plurality of openings 38 formed in an otherwise closed end 37 of bung 16. Thus once again the flaps 36 can move open (as illustrated on the left hand side of the drawing) to allow milk to flow into the chamber 29 and can close (as shown on the right hand side) in the event of a back flow caused by the animal squeezing on the teat. Further arrangements will be readily apparent to those skilled in the art. For example, the end 31 of bung 16 as shown in FIG. 12 can be of a configuration which narrows to a point 39 which includes either a transverse or longitudinal slit or slits 40 operable in a manner similar to a conventional teat (as shown—ie extending completely into extremity 41) or indeed according to configuration of slits in the nipple 17 of the teat of the present invention (ie not into the extremity 41).

By having the slit(s) in the outlet end of the teat not extending into or across the wall portion which forms the extreme end of the teat a better and more consistent seal is achieved. Thus when the animal sucks on the teat the slit(s) open to allow feed flow to take place. When the sucking action ceases the slit(s) close to seal against flow from the internal cavity 29.

The construction as disclosed provides an unrestricted chamber or cavity 29 within the teat. This not only leads to reduction in production difficulties and cost due to the manufacturing mandrel being able to be pulled directly out of the teat but it provides a bigger milk chamber 29 in the teat. Thus an animal can, in a given period of time, obtain a greater volume of feed than with conventional teats.

Also the external flaring of the body 15 of the teat provides for a softer and more resilient outlet end 12 and dissuades the animal from sucking too far up the teat the end result of which is often damage to the mouth of the animal in the form of abscesses and the like.

The teat according to the present invention is extremely versatile in that it can be used in both flood feed and tube feed situations. Furthermore without the valve or bung inserted into the inlet end the teat can be applied to the end of a bottle for bottle feeding. Thus one teat can function in three quite distinct feeding arrangements.

What is claimed is:

1. A teat comprising a hollow body made of a resilient material, said body having an inlet end and an outlet end, said outlet end including a protuberance or nipple which defines an end wall portion merging into a side wall portion which in turn merges into that part of the body forming the outlet end of the teat, there being at least one slit through the side wall portion of the protuberance or nipple said at least one slit not extending into the end wall of the protuberance or nipple.

2. The teat according to claim 1, wherein said at least one slit extends along said side wall portion from where it merges into said part of the body forming the outlet end.

3. The teat according to claim 2, wherein there are a plurality of slits which extend substantially axially relative to a longitudinal axis of symmetry of the body.

4. The teat according to claim 3, wherein there are two slits.

5. The teat according to claim 4, wherein the slits are diametrically opposed relative to the longitudinal axis of symmetry of the body.

6. The teat according to claim 4, wherein the slits do not intersect.

7. The teat according to claim 3, wherein the slits do not intersect.

8. The teat according to claim 1, wherein the body includes an outwardly flared external surface adjacent the inlet end of the body.

9. The teat according to claim 1, wherein the inlet end of the body includes a valve means.

10. The teat according to claim 1, wherein the body is formed from a thermoplastic rubber material.

11. A teat comprising a hollow body made of a resilient material, said body having an inlet end and an outlet end, said outlet end including a protuberance projecting from the outlet end, said protuberance having an end wall portion merging into a side wall portion which in turn merges into that part of the body forming the outlet end, at least one slit through the side wall of the protuberance with said at least one slit not extending into that end wall of the protuberance, said inlet end having engaged therein a valve which in use with the teat being full of a liquid prevents liquid from flowing back through said inlet end upon a squeezing action being applied to the teat.

12. The teat according to claim 11, wherein the valve is moulded from a resilient plastics material and includes a body having a flow passage extending from an inlet section to an outlet section, the outlet section being located within the hollow body of the teat, said outlet section being covered by a moveable flap which is integrally formed with the valve body.

13. The teat according to claim 11, wherein the valve is moulded from a resilient plastics material and includes a body having a flow passage extending from an inlet section to an outlet section, said outlet section being closed by a wall having at least one slit therein, said at least one slit being openable upon liquid flowing from the inlet section to the outlet section to thereby permit liquid flow to pass from the flow passage and into said hollow body.

14. The teat according to claim 11, wherein the valve includes a body having a flow passage which extends from an inlet section to an outlet section, said flow passage terminating at the outlet section in a partition having a plurality of openings, there being at least one flap located within the hollow body of the teat and engageable over the plurality of openings to close said plurality of openings upon a back flow of liquid occurring in the hollow body.

15. The teat according to claim 11, wherein the valve includes a flow passage having an inlet section and an outlet section, there being a plurality of flaps in the flow passage which can overlap upon a back flow of liquid occurring in the flow passage to close the flow passage between the inlet and outlet sections thereof.

16. The teat according to claim 15, wherein the flaps are formed integrally with walls of the flow passage.

* * * * *